A. G. BELDEN.
HEAD STOCK.
APPLICATION FILED OCT. 5, 1914.
1,150,243.
Patented Aug. 17, 1915.
2 SHEETS—SHEET 2.
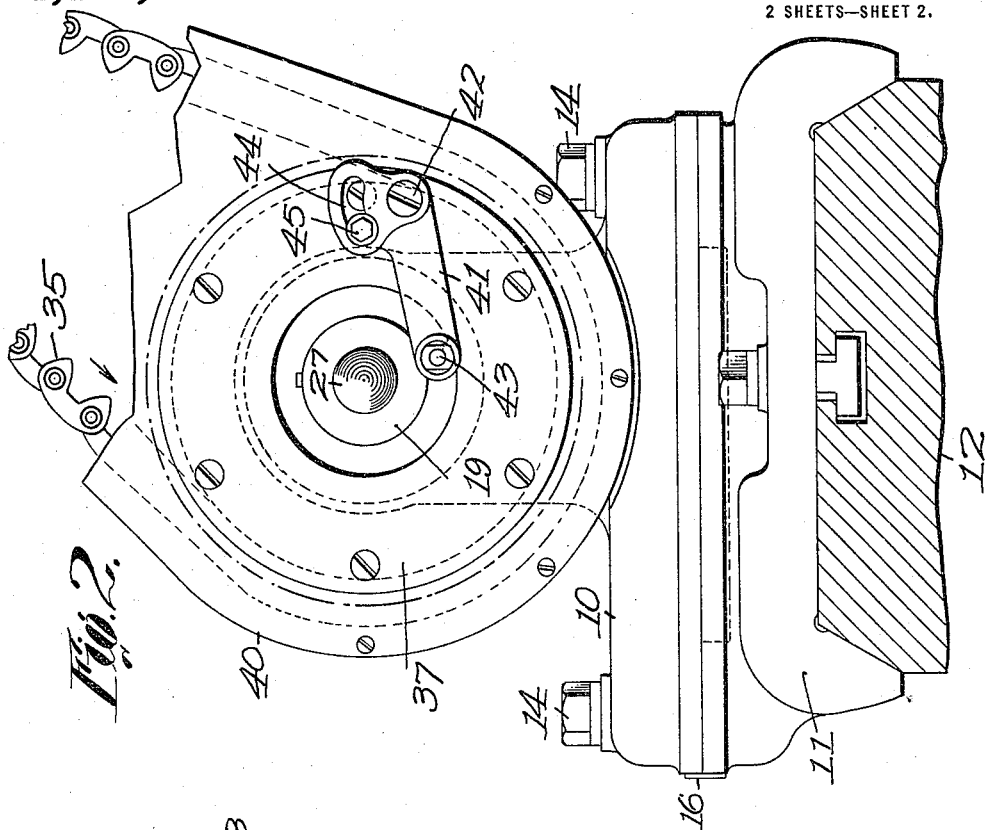
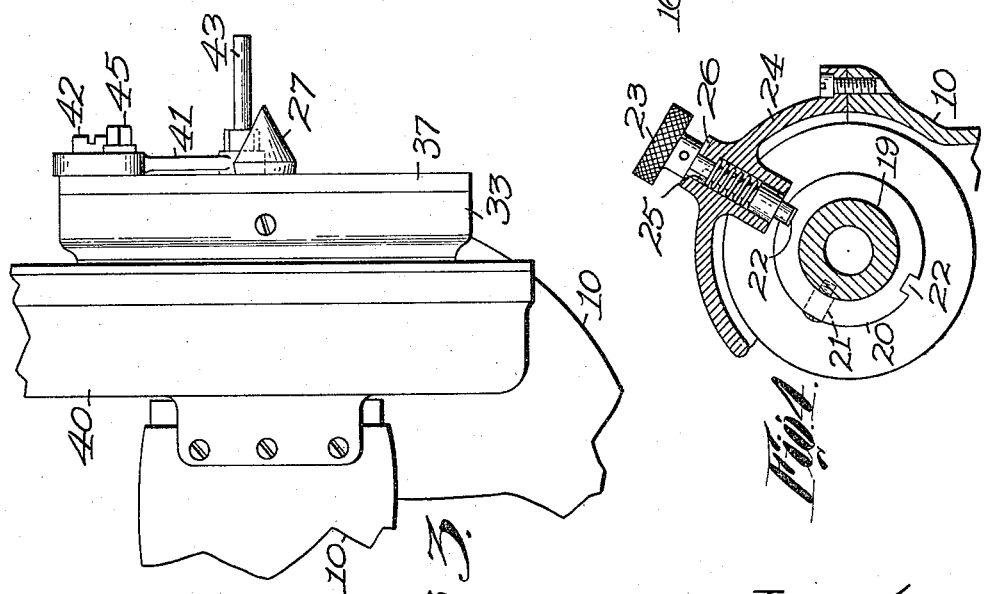
Witnesses:
C. F. Wesson
C. L. Hartnett
Inventor
A. G. Belden
By Attorneys
Southgate & Southgate

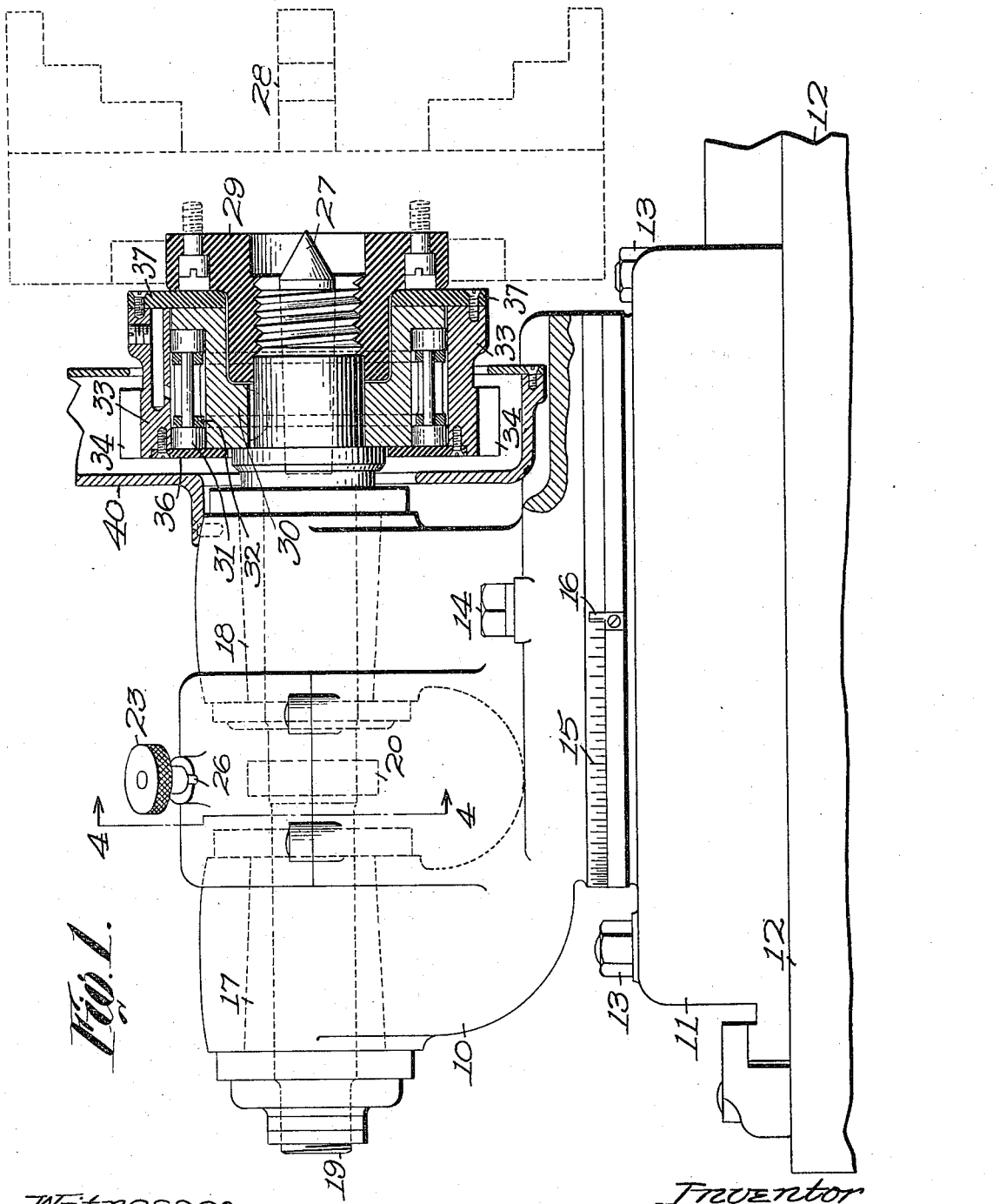

UNITED STATES PATENT OFFICE.

ALBERT G. BELDEN, OF WORCESTER, MASSACHUSETTS, ASSIGNOR TO NORTON GRINDING COMPANY, OF WORCESTER, MASSACHUSETTS, A CORPORATION OF MASSACHUSETTS.

HEAD-STOCK.

1,150,243.  Specification of Letters Patent.  Patented Aug. 17, 1915.

Application filed October 5, 1914. Serial No. 865,037.

*To all whom it may concern:*

Be it known that I, ALBERT G. BELDEN, a citizen of the United States, residing at Worcester, in the county of Worcester and State of Massachusetts, have invented a new and useful Head-Stock, of which the following is a specification.

This invention relates to a head stock of a type particularly adapted for use on cylindrical grinding machines. In such machines the work is supported for rotation upon a longitudinally movable work table and may be mounted, according to its nature, either on a pair of dead centers or in a chuck supported on the head stock.

The principal object of my invention is to provide improved means for rotating the work upon the centers or for rotating the chuck, as may be desired. With this general object in view, my invention, in the preferred form, contemplates the provision, in a headstock, of a freely rotatable spindle and means for locking the spindle in fixed position. The head center and chuck are supported by this spindle when either is in use. A driving member is rotatably supported upon the spindle and improved devices are provided for frictionally connecting the driving member to the spindle when rotation of the latter is desired. At all other times the driving member rotates freely with respect to the spindle, suitable provision being made for driving the work supported upon the dead centers from the rotating driving member.

It is one of the objects of my invention to provide an improved device for thus driving the work upon the dead centers.

My invention further consists in certain devices, arrangements and combinations of parts which will be hereinafter described and more particularly pointed out in the appended claims.

A preferred form of the invention is shown in the drawings in which—

Figure 1 is a side elevation of the head stock, partly in section; Fig. 2 is a front elevation of the head stock with the chuck and its face plate removed; Fig. 3 is a plan view of certain of the parts shown in Fig. 2; and Fig. 4 is a sectional detail view taken along the line 4—4 in Fig. 1.

My improved head stock comprises a frame 10 angularly adjustable upon a base 11, which in turn is longitudinally adjustable upon a work table 12. The base 11 may be secured in adjusted position upon the table 12 by the binding bolts 13 and the frame 10 is secured in its angularly adjusted position on the base 11 by the bolts or studs 14. The frame 10 may be provided with angular graduations 15 near the bottom thereof which coöperate with a gage plate 16 mounted upon the base 11, to facilitate the angular adjustment of the head stock.

The frame 10 supports bearings 17 and 18 in which the spindle 19 is freely rotatable. Suitable provision is made for preventing longitudinal movement of the spindle relative to the bearings and the spindle is provided between the bearings with a collar 20 which may be secured to the spindle by a stud 21 or in any other convenient manner.

The collar 20 is provided with one or more recesses 22 adapted to receive the end of a spring-pressed plunger 23 mounted upon a casting 24 secured to the frame 10. The plunger 23 is provided with a laterally extending lug 25 which may be raised above the casting 24 and seated in a notch or depression 26, when free rotation of the spindle is desired. When the plunger 23 is allowed to return to its lower position, it coöperates with one of the recesses 22 in the collar 20 to lock the spindle 19 against rotation.

The usual tapered center 27 is fitted within the spindle 19 and a chuck 28 of any usual form may be mounted upon the outer end of the spindle. It is customary in mounting the chuck to secure the same to a face plate 29 threaded to fit the screw on the spindle and having a rearward extension fitting the end of the cylindrical portion thereof.

To provide for the rotation of the spindle or the work supported thereon the following driving mechanism is supplied: A substantially cylindrical member 30 is fixed to the outer end of the spindle and may be keyed thereto as shown in Fig. 1. The fixed member 30 provides a bearing for a set of rolls 31 supported in a cage 32 and constituting a roller bearing for a driving member 33. As shown in the drawings, the member 33 is provided with sprocket teeth 34 and is driven by a sprocket chain 35 but any other convenient means for rotating the member 33 may be utilized.

The driving member 33 is provided with a washer 36 upon its rear face which retains the rolls in position. Upon its opposite face, the member 33 carries a friction plate 37 which extends inward over a radial surface of the fixed member 30. The driving devices are inclosed within a suitable guard or casing 40 and the means for driving the chain 35 may be of any usual or desired form.

When the work to be operated upon is of such a nature that it can be most conveniently supported in the chuck, the chuck and its face plate are screwed upon the spindle. As shown in Fig. 1, the face plate is so proportioned that the rear face of its outer portion will engage the friction plate 37 and force it firmly against the radial surface of the fixed member 30. In this way the driving member 33 is frictionally connected to the fixed member 30 and the spindle 19, so that the driving member 33, the spindle 19, and the chuck 28 will all rotate together. When, however, the nature of the work is such that it can be best supported upon dead centers, the chuck 28 and the face plate 29 are removed and the plunger 23 is lowered to engage the collar 20. The removal of the face plate 29 relieves the pressure upon the friction plate 37, and the driving member 33 is thereafter free to rotate upon its roller bearing, relatively to the fixed member 30.

In order to drive the work which is supported upon the dead centers, a driver 41 is pivotally secured to the friction plate 37 by a stud 42, the driver being provided with the usual extension 43 for engaging the work or a dog secured thereto. The driver is also provided with a slot 44 concentric with the stud 42 and adapted to receive a binding bolt 45 by which the driver may be adjusted with the extension 43 at any desired distance from the center 27. The driver is thus adapted to readily engage work of any size.

From the foregoing description, it will be seen that the change from a dead center to a live spindle is secured merely by screwing the chuck and its face plate upon the spindle and by withdrawing the plunger 23, no further action being necessary to couple the driving member to the spindle.

Having thus described my invention it will be evident that many changes and modifications can be made therein by those skilled in the art without departing from the spirit and scope thereof as expressed in the claims, and I do not wish to be otherwise limited to the details herein disclosed, but

What I do claim is:—

1. A head stock having, in combination, a rotatable spindle, means to at times prevent rotation of said spindle, a driving member rotatable relatively to said spindle, a face plate on said spindle, and means effective to frictionally connect said member and said spindle, said means being controlled by said face plate and being forced into frictional engagement by said face plate when the latter is in operative position on said spindle.

2. A head stock having, in combination, a rotatable spindle, means to at times prevent rotation of said spindle, a driving member rotatable relatively to said spindle, a face plate, and means to connect said driving member to rotate said spindle, said means being rendered effective by placing said face plate in operative position on said spindle.

3. A head stock having, in combination, a rotatable spindle, means to at times prevent rotation of said spindle, a driving member rotatable relatively to said spindle, a friction plate mounted on said member, and means to cause said plate to engage a surface fixed relatively to said spindle to thereby drive the latter.

4. A head stock having, in combination, a rotatable spindle, means to at times lock said spindle against rotation, a member fixed to said spindle, a driving member rotatable relatively to said fixed member, and means to cause said driving member to frictionally engage said fixed member, said driving member thereby becoming effective to rotate said spindle.

5. A head stock having, in combination, a rotatable spindle, means to at times prevent rotation of said spindle, a member fixed to said spindle and having a radial surface, a driving member rotatable relatively to said fixed member, a friction plate mounted on said driving member adjacent to said radial surface, and means to cause said plate to frictionally engage said surface thereby rendering the driving member effective to rotate said spindle.

6. A head stock having, in combination, a rotatable spindle, means to at times prevent rotation of said spindle, a member fixed to said spindle and having a radial surface, a driving member rotatable relatively to said fixed member, a friction plate mounted on said driving member adjacent to said radial surface, and a face plate on said spindle, the rear surface of said face plate when in operative position engaging said friction plate and forcing the same against the radial surface thereby frictionally connecting the driving member to the spindle.

7. A head stock having, in combination, a rotatable spindle, means to rotate said spindle, means to lock said spindle against rotation, said latter means comprising a recessed collar on said spindle, and a plunger movable into a recess in said collar to lock said spindle against rotation, and means to hold said plunger in retracted position.

8. A head stock having, in combination, a spindle, a center in said spindle, a plate rotatably supported on said spindle, means to drive said plate, and a driver secured to said plate and adjustable toward and from said center.

9. A head stock having, in combination, a spindle, a center in said spindle, a plate supported on said spindle, and a driver pivoted to said plate and angularly adjustable about its pivot, said driver having a work engaging extension which is thereby movable toward and from said center.

In testimony whereof I have hereunto set my hand, in the presence of two subscribing witnesses.

ALBERT G. BELDEN.

Witnesses:
CHAS. R. SARGENT,
RAY D. HUBBELL.

Copies of this patent may be obtained for five cents each, by addressing the "Commissioner of Patents, Washington, D. C."